(12) United States Patent
Backmann et al.

(10) Patent No.: US 12,350,877 B2
(45) Date of Patent: Jul. 8, 2025

(54) STRETCHING DEVICE AND METHOD FOR STRETCHING A PLASTIC FILM IN THE TRANSPORT DIRECTION THEREOF

(71) Applicant: WINDMOELLER & HOELSCHER KG, Lengerich (DE)

(72) Inventors: Martin Backmann, Lengerich (DE); Karsten Golubski, Lengerich (DE); Manuel Sollert, Lengerich (DE); Raphael Gross, Lengerich (DE)

(73) Assignee: WINDMOELLER & HOELSCHER KG, Lengerich (DE)

( * ) Notice: Subject to any disclaimer, the term of this patent is extended or adjusted under 35 U.S.C. 154(b) by 214 days.

(21) Appl. No.: 17/906,852

(22) PCT Filed: Feb. 12, 2021

(86) PCT No.: PCT/EP2021/053515
§ 371 (c)(1),
(2) Date: Sep. 20, 2022

(87) PCT Pub. No.: WO2021/185519
PCT Pub. Date: Sep. 23, 2021

(65) Prior Publication Data
US 2023/0173739 A1 Jun. 8, 2023

(30) Foreign Application Priority Data

Mar. 20, 2020 (DE) ............. 10 2020 203 644.6
Jul. 15, 2020 (DE) ............. 10 2020 208 857.8
Dec. 23, 2020 (DE) ............. 10 2020 134 815.0

(51) Int. Cl.
*B29C 55/06* (2006.01)
*B29C 48/00* (2019.01)
(Continued)

(52) U.S. Cl.
CPC .......... *B29C 55/06* (2013.01); *B29C 48/0018* (2019.02); *B29C 48/08* (2019.02); *B29C 55/28* (2013.01)

(58) Field of Classification Search
CPC ..................................... B29C 55/06
See application file for complete search history.

(56) References Cited

FOREIGN PATENT DOCUMENTS

| CN | 103224152 A | 7/2013 | |
|----|-------------|--------|---|
| CN | 107431166 A | * 12/2017 | ......... B29C 48/0018 |

(Continued)

OTHER PUBLICATIONS

ISA European Patent Office, International Search Report Issued in Application No. PCT/EP2021/053515, May 17, 2021, WIPO, 5 pages.

*Primary Examiner* — John J DeRusso
(74) *Attorney, Agent, or Firm* — McCoy Russell LLP

(57) ABSTRACT

The invention relates to a stretching device for stretching a plastic film in the transport direction thereof, having a first roll, which can be driven by a first drive and can be rotated at a first rotational speed, and having a second roll, which can be driven by a second drive and can be rotated at a second rotational speed, wherein the second rotational speed is greater than the first rotational speed, and the second roll is arranged downstream of the first roll in the transport path of the plastic film, wherein at least one of the rolls is a roll through which air can flow inwards from the outside. According to the invention at least one roll through which air can flow can be continuously cleaned.

10 Claims, 6 Drawing Sheets

(51) Int. Cl.
*B29C 48/08* (2019.01)
*B29C 55/28* (2006.01)

(56) References Cited

FOREIGN PATENT DOCUMENTS

| | | | | |
|---|---|---|---|---|
| DE | 10339262 A1 | 3/2005 | | |
| DE | 202020000221 U1 | * 4/2020 | ............ | B29C 55/06 |
| EP | 1095758 A2 | 5/2001 | | |
| TW | 201012730 A | 4/2010 | | |

* cited by examiner

STRETCHING DEVICE AND METHOD FOR STRETCHING A PLASTIC FILM IN THE TRANSPORT DIRECTION THEREOF

CROSS REFERENCE TO RELATED APPLICATIONS

The present application is a U.S. National Phase of International Application No. PCT/EP2021/053515 entitled "STRETCHING DEVICE AND METHOD FOR STRETCHING A PLASTIC FILM IN THE TRANSPORT DIRECTION THEREOF," and filed on Feb. 12, 2021. International Application No. PCT/EP2021/053515 claims priority to German Patent Application No. 10 2020 203 644.6 filed on Mar. 20, 2020, and to German Patent Application No. 10 2020 208 857.8 filed on Jul. 15, 2020, and to German Patent Application No. 10 2020 134 815.0 filed on Dec. 23, 2020. The entire contents of each of the above-listed applications are hereby incorporated by reference for all purposes.

TECHNICAL FIELD

The disclosure relates to a stretching device and a method for stretching a plastic film in the transport direction thereof.

BACKGROUND AND SUMMARY

Such a stretching device is used to specifically influence the properties of a plastic film. Such stretching changes in particular the orientation of the molecules contained in the plastic film (hereinafter also referred to simply as "film"). In order to bring about stretching, the stretching device comprises a first roll, which can be driven by a first drive and can be rotated at a first rotational speed. The stretching device further comprises a second roll, which can be driven by a second drive and can be rotated at a second rotational speed. In the transport path of the plastic film, the second roll is arranged downstream of the first roll. The plastic film is now stretched by the second rotational speed being greater than the first rotational speed.

However, stretching can also cause various problems. For example, monomers that outgas during the production of the plastic film or dusts that are pressed into the film during stretching often adhere to the plastic film after stretching. The heat transfer between the film and the roll is often insufficient. Furthermore, properties of the film, in particular geometric properties such as the thickness profile, in a direction transverse to the transport direction of the film and also the flatness of the film, can change as a result of the stretching.

It is precisely this change in the thickness profile that is undesirable. This occurs when a plastic film is stretched monoaxially in the transport direction due to a transverse constriction, also known as neck-in, as the edges of the film thicken at the same time. These thickened edges usually have to be cut away, as they lead to a reduction in the quality of the film. The aim in the production of monoaxially concealed films is therefore to reduce neck-in and the associated thickening of the film edges as much as possible. Various approaches to technical solutions have been proposed for this purpose.

A more recent approach to solving the aforementioned problem has become known from DE 20 2020 000221 U1. Here, it is proposed that at least one of the rolls is a roll through which air can flow inwards from the outside. This is to ensure that the air drawn in underneath the film web can flow continuously over the roll through which air can flow to the inside of the roll. A vacuum source is usually connected to the roll so that the vacuum suctions the film web onto the roll and makes it adhere more firmly to it. This is to prevent or at least reduce neck-in and thickening of the film edge, as the film lies firmly against the roll surface by means of the negative pressure generated. The negative pressure should be adjusted in such a way that the adhesion of the film web to the roll surface is improved by the increased friction, and the relative speed in the transverse and longitudinal direction between the film and the roll is prevented.

However, in the proposed method in DE 20 2020 000221 U1, problems arise due to the properties of the films to be processed, which may lead to failure of the production line. The problems stem from the fact that the film has to be heated with heating rolls before the actual stretching process. This causes the film to emit various chemical elements, in particular paraffins. Paraffins in particular can lead to problems in the outer, partially porous structure of the rolls, which can impair the function of the rolls and even lead to stand-stills. In this case, the entire system has to be stopped and the rolls have to be cleaned thoroughly by removing the condensed paraffins from the openings in the roll surface.

It is therefore the object of the present disclosure to propose a stretching device with which an interruption of the film production due to a standstill of the stretching device can be prevented.

Thus, a stretching device for stretching a plastic film in the transport direction thereof is proposed, having a first roll, which can be driven by a first drive and can be rotated at a first rotational speed, and having a second roll, which can be driven by a second drive and can be rotated at a second rotational speed, wherein the second rotational speed is greater than the first rotational speed, and the second roll is arranged downstream of the first roll in the transport path of the plastic film, wherein at least one of the rolls can have air flowing through it inwards from the outside. According to the disclosure, the at least one roll through which air can flow can be continuously cleaned.

The continuous cleaning of the openings in the roll through which air flows can reliably prevent these through-openings or pores from becoming clogged with paraffin or other components originating from the film. This ensures that the air flow through the roll surface is continuously maintained. This can largely prevent a system standstill and loss of production.

Thus, through-openings can be provided in the roll shell of the at least one roll through which air can flow, wherein the through-openings represent a fluid-communicating connection between the outer surface and at least one cavity inside the roll. Such through-openings allow at least part of the air trapped between the film and the surface elements of the respective roll on which the film rests to be discharged into the cavity of the roll. Consequently, a reduced amount of air remains between the film and the surface elements, so that the film adheres more firmly to the surface elements of the roll surfaces and exhibits the undesired effects to a reduced extent or not at all.

The through-openings in the roll shell can be formed at least in part in each case by bores and/or porous material of which the roll shell consists at least in part.

The holes provided here can be smaller than 2 mm, or smaller than 1 mm, and in particular smaller than 0.5 mm. The transitions from the holes to the surface of the part of the roll shell can be rounded or conical. This measure again prevents damage to the film. A plurality of holes can be evenly distributed over the roll shell, wherein a certain number of holes can be provided per surface element. However, the distances between two adjacent holes can be varied. The number of holes per surface element or the number of through-holes per surface element may be varied, in particular in the longitudinal direction of the roll shell, i.e. in the direction of the axis of rotation. In particular at the edges of the roll shell, the number of holes or through-holes per surface element can be greater than in the central region, so that the film adheres more firmly to the roll at the edges. The edges can each take up one third of the roll shell length, so that the central region also comprises one third. However, the central region can also be larger, so that the edges are correspondingly smaller in each case. By varying the number of holes per surface element or the number of through-holes per surface element in this way, the volume flow that passes through the wall of the roll can generally be varied. Such a variation can alternatively or additionally be achieved with sintered materials by varying the layer thickness of the sintered material so that there are different resistances for the volume flow.

Due to the alternatively or additionally provided porous material, it is possible to create a large number of small channels that serve as through-openings.

The openings on the outer surface of the roll are small and their edges do not have any negative effects on the film; for example, in the form of marks. Thus, the object described above is achieved without having to accept new disadvantages. The porous material can, in this case, form part of the shell of the roll or at least be a part thereof. The average pore size of the porous material can be between 5 and 100, in particular between 10 and 60 or between 20 and 45 micrometers.

A porous material can be a sintered material, in particular a sintered metal. A sintered material is a material that has been produced by a sintering process. In this process, fine-grained materials, which can be ceramic or metallic or comprise plastic, are heated—often under increased pressure—but the temperatures remain below the melting temperature of the main components so that the shape of the workpiece is retained. For example, the shape can be sleeve-shaped, creating a sleeve that can later be applied to a base body. The base body and sleeve can then form the roll. Such a sleeve can also be produced in an additive manufacturing process, wherein a three-dimensional body can be produced from a powdery raw material by local heating. The granularity of the material results in channels remaining between the grains, which form through-openings. The circumferential surface of a roll produced in this way can additionally be ground and/or polished to prevent damage to the film. However, in order to avoid unintentional closure of the through-holes by the abrasion, the surface of the roll can subsequently still be treated by an etching process. The through-openings are usually not straight, but this does not detract from the ability to discharge air into the interior of the roll. A sintered material is usually a very hard material, so that despite the high tensile forces within a stretching device, there is only a small amount of deflection, so that the geometric properties of the film in particular are hardly affected. In addition, the production of a sintered material is usually relatively inexpensive.

A roll shell can encompass the roll surface, so that holes consequently extend from the surroundings of the roll into the interior of the roll. It is also possible to make the roll shell multi-layered. For example, an inner part of a roll shell may be provided, which includes holes. An outer part of the roll shell may comprise the porous material, in particular a microporous material. In this way, it can be avoided that edges of a hole are marked on the film, making it unusable.

According to an embodiment, only one part of the roll through which air can flow can have air flowing through it inwards from the outside, while another part can have air flowing through it outwards from the inside.

This it can be that one the one hand, means are provided for generating a vacuum, via which air can flow at least partially inwards from the outside through the roll through which air can flow in the region in which the film is wrapped around it, and in that on the other hand, means are also provided for generating an overpressure, via which air can be blown outwards from the inside through the through-holes outside the region in which the film is wrapped around, at least in partial regions, in order to clean the film.

Particularly, the roll through which air can flow has at least one cavity in the form of a chamber that is divided in the axial direction and/or in the circumferential direction into at least two segments by means of at least one separating element, wherein at least one segment in each case can be acted upon by an air pressure that is reduced or increased in comparison with the ambient pressure.

Due to the at least one cavity with the reduced air pressure compared to the ambient pressure, it is achieved that a part of the amount of air, that is supplied to the cavity of one of the rolls, can be discharged from the cavity, for example via through-openings. In this way, the air that is repeatedly introduced by the movement of the film and the roll can be continuously removed, so that a stationary state can be set with regard to the reduced amount of air between the plastic film and surface elements of the first roll and/or the second roll on which the film rests. One possibility for pressurising the cavity is a rotary feed-through via a journal of the respective roll. A tube or pipe can be connected to this rotary union, which connects the interior with a vacuum source, in particular a pump, in a fluid-communicating manner.

The at least one cavity with the increased pressure compared to the ambient pressure makes it possible to remove dirt from through-openings by means of a blowing-out process.

Additionally or alternatively, according to a further embodiment of the disclosure, a suction device can be provided which is arranged in an angular region of the first and/or the second roll in which no film rests, i.e. between the release line and the leading edge of the film. In this way, it is even more possible to remove dirt from the surface of the roll. Such a suction device can extend at least partially in the direction of the roll axis. Such a suction device can also have several separate suction chambers, the sizes of which can also be changed so that the suction device can be charged with different suction capacities. In regions in the direction of the roll that are not in contact with the film, for example, the suction power can be lower than in the other regions, as there is usually less contamination to expect here.

The roll through which air can flow further comprises at least one cavity that is divided in the axial direction and/or in the circumferential direction into at least two segments by means of at least one separating element, wherein at least one segment in each case can be acted upon by an air pressure that is reduced or increased in comparison with the ambient pressure. Each segment can thus be subjected to different air pressures so that, for example, in the axial direction of the roll, the amount of air between the plastic film and surface elements of the first roll and/or the second roll on which the film rests can be varied differently. In particular, two separating elements, as then, for example, the edge regions and the central region can be subjected to different negative pressures when viewed in the axial direction. In particular, it is intended to apply a higher negative pressure to the film in its edge regions than in its useful area, so that damage to the film in the useful area is avoided. These separating elements can be arranged immovably relative to a roll shell. These separating elements may be arranged so that they can be moved relative to the roll axis.

Separating elements can alternatively or additionally subdivide, i.e. segment, the inner cavity of one of the aforementioned rolls in the circumferential direction. Such separating elements consequently run parallel to the longitudinal direction of the respective roll. In particular, a roll shell can be rotatably mounted about a roll axis, wherein the separating element(s) can be arranged immovably relative to the axis. This makes it possible, for example, to arrange a segment below the surface elements of the first roll and/or the second roll on which the film rests. Consequently, negative pressure and/or overpressure is only generated in the region of these surface elements, while essentially ambient pressure prevails in another segment. In this way, the effectiveness of the means for changing the air volume is increased, as no ambient air is drawn in, but only the air volume at the relevant regions is changed. At least in the region of the detachment line, the importance of which is explained below in conjunction with a detachment roll, a segment can be provided that can be subjected to an overpressure. This ensures that the film detaches from the first and/or second roll along a real detachment line that deviates only slightly from the target detachment line.

The segment in whose active region the film does not rest may be subjected to an overpressure, wherein an air flow from the inside of the roll to the outside can be effected. In this way, the continuous cleaning of the through-openings can be effected, so that increasing contamination and clogging of the through-openings over time can be avoided.

For example, at least three separating elements can also be provided in the circumferential direction, so that at least three segments can be provided. For example, there is an arrangement option in which a segment pressurized with negative pressure is arranged in the run-up area of the film and a segment pressurised with positive pressure is arranged in the run-out area. In all remaining areas, there may be an even further increased overpressure. Thus, in the area where the film meets the surface of the roll (run-up area), the entrained air can be suctioned-off. In the region where the film leaves the surface again (run-out area), the film can be detached from the surface of the roll with an overpressure, which prevents the film from detaching at different circumferential angles of the roll when viewed over its width. Avoiding this effect leads to improved properties, in particular geometric properties of the film. The application of the further increased overpressure in the other segments serves to clean the through-openings in the roll shell.

The individual segments can be controlled individually with regard to the magnitude of the negative pressure and/or overpressure. The control can be carried out by a computing—and control unit, which compares measured data from sensors with target data for the control. Such measurement data can be transmitted to the calculation and control unit by measurement sensors with which the measurement of the geometric properties of the film, in particular the thickness profile of the film, can be carried out. In this way, regulation of the overpressure and/or negative pressure in each segment can be established.

In order to be able to change the amount of air between the plastic film and surface elements of the first roll and/or the second roll on which the film rests, at least one suction device is provided in one embodiment of the disclosure, with which air can be suctioned out of the region in which the plastic film comes into contact with the first and/or the second roll in the transport direction. In particular when the film runs onto the roll, the air entrained by the film gets between the surface elements of the roll and the film. By means of the extraction device, this air can now be suctioned-off in a targeted manner, so that significantly less air is introduced into the aforementioned region.

In a further development, it is provided that the suction device is divided into sections transverse to the transport direction of the plastic film. Thus, it is possible that a suction device extending over the entire width of the plastic film is divided into segments. However, individual sections can also be provided that are independent of one another. Extracting air in the region of the edges of the plastic film, for example, may minimise the influence of stretching on the geometric properties of the film in its edge region. If such independent sections are provided, this can be positioned in the transverse direction of the film, i.e. parallel to the axis of the respective roll, by means of a positioning device in order to be able to adapt the sections of the suction device to different film widths.

The individual sections can be controlled individually with regard to their suction power. The control can be carried out by a computing and control unit, which compares measured data from sensors with target data for the control. Such measurement data can be transmitted to the computing and control unit by measurement sensors with which the measurement of the geometric properties of the film, in particular the thickness profile of the film, can be carried out. In this way, regulation of suctioning off the air can be established.

The overpressure is generated by means of an overpressure device, with which the surface of the plastic film facing away from the roll can be pressurized with the fluid subjected to overpressure, in particular air. In this way, the back of the film, i.e. the side facing away from the roll, is subjected to a force applied by the air subjected to overpressure. This allows the film to be pressed against the roll with greater force, so that a smaller proportion of the air can enter the region between the film and the roll. Furthermore, a sufficiently high overpressure can be created to achieve the cleaning of the through-openings. As with the above-described extraction device, the overpressure device can be divided into sections, which can additionally be position-adjustable in the direction of the roll axis. A control and/or regulation of the overpressure and/or the volume flow can also be provided. This can also be done individually, in particular in sections.

If, in particular, the means configured as an overpressure device for changing the amount of air are arranged in the edge regions of the roll, it can be provided that the fluid with which the edge regions of the roll, on which, in particular, the edge regions of the film rest, is impinged with a cold fluid. A "cold fluid" refers to a fluid that has a temperature below 50 degrees Celsius, or below 30 degrees Celsius, or below 15 degrees. The edge regions of the film have a higher stiffness than the useful area of the film before running onto the relevant roll, so that the edge regions no longer migrate inwards to such an extent. In other words, the neck-in is reduced.

According to a further configuration of the disclosure, heating means are provided by means of which at least a part of the air flowing through the through-openings of the roll through which air can flow can be heated to such an increased temperature that synthetic material residues, for example paraffins, accumulated in the through-openings can be melted and thus blown out and/or suctioned-off more easily.

The heating means can consist of a temperature control device. Such a temperature control device can in particular be integrated into the roll through which air can flow. For example, the roll body can have at least one pipeline running through it, through which a temperature-controlled fluid can be conducted. Such a pipeline can extend in the axial direction of the roll to ensure rapid fluid distribution. This pipeline can, for example, be designed as a hole in the roll shell. However, the course of the pipeline can also be different, for example helical, in order to be able to generate a greater heat transfer. In this case, the pipeline can be formed by a pipe or a tube that, in the case of a hollow roll shell, is arranged inside this roll shell. If the roll shell is designed to be multi-layered, the pipeline can also be arranged between two layers. Several pipelines are also conceivable in order to be able to apply different temperatures to different zones of the roll. The temperature-controlled fluid may be fed into the roll through one or more rotary unions on the front side.

In particular when designing the roll in combination with sintered materials, it is possible to design the roll shell in at least two layers. An inner layer can comprise coarser pores compared to the outer layer, so that the fluid can be conducted through these pores. According to the disclosure, the outer layer can reduce the amount of air between the film and the roll by diverting air.

In a further variant of the disclosure, the first and/or the second roll may comprise at least one heating wire embedded in a surface layer of the roll. This embedding can be produced in particular in combination with a design of this surface layer from a sintered material.

In an embodiment of the disclosure, a temperature control device can be designed as an induction device. In particular, a device for providing a magnetic field, which is part of the induction device, may be arranged within the roll to increase the efficiency of this temperature control device. However, in order to ensure a simpler construction, an arrangement outside the roll is also conceivable.

Alternatively or additionally, temperature control devices are conceivable that are based on further physical principles. For example, the temperature of the film can be changed by a device for generating infrared radiation. This may be arranged outside of one of the rolls. A temperature-controlled gas, which can be conducted from at least one nozzle directly onto the film, can also be provided for temperature control. In particular, air is provided as the gas. A device for generating infrared radiation and/or a nozzle can also be arranged inside the roll.

A further development of the disclosure provides that at least one segmented chamber is arranged in the roll through which air can flow, via which solvent accommodated therein can be pressed through the through-openings for the cleaning thereof. This dissolves and rinses out the impurities stuck in the openings, for example the paraffins.

An alternative embodiment provides that at least one burner for burning away synthetic material residues or means for generating an ion beam or means for generating a corona for removing the synthetic material residues are arranged on the outside in the region of the surface of the roll through which air can flow that is not wrapped by the film. The passage openings can also be cleaned by these means. If necessary, they can be provided in addition to the applied overpressure.

Alternatively or additionally, at least one scraper for scraping off solid substances from the surface is also arranged on the outside in the region of the surface of the roll through which air can flow that is not wrapped by the film.

The above-mentioned object is also achieved by a method for stretching a plastic film in the transport direction thereof, having a first roll, which is driven by a first drive and is rotated at a first rotational speed, and having a second roll, which is driven by a second drive and is rotated at a second rotational speed, wherein the second rotational speed is greater than the first rotational speed, wherein the second roll is arranged downstream of the first roll in the transport path of the plastic film, wherein at least one of the rolls has air flowing through it inwards from the outside, and wherein this at least one roll through which air can flow is continuously cleaned.

With this method according to the disclosure, the same advantages can be achieved as have already been described in conjunction with a device according to the disclosure.

In a further aspect of the disclosure, a blown film system is provided having at least one extruder for producing a plastic melt, a nozzle head for producing a film tube from the plastic melt, a flat laying device for converting the film tube into a double-layered plastic film, a driven drawing-off device for drawing off and further transporting the double-layered plastic film and a winding device for winding up at least one layer of the double-layered plastic film, wherein a stretching device is provided according to the above description.

Such a blown film system can optionally comprise a calibration device arranged upstream of the flat laying device in the transport direction. Furthermore, a reversing device can be provided, which is arranged downstream of the drawing-off device and with which defects, in particular deviations from the average film thickness, can be displaced across the film width. A stretching device according to the disclosure can now be arranged downstream of the drawing-off device; for example, between the drawing-off device and an optional reversing device. An arrangement of the stretching device between a reversing device and the winding device is also conceivable. The plastic film can be fed to the stretching device as a film tube laid flat or as a double-layered plastic film cut on one or both sides. A plastic film cut on one side may have been previously unfolded and fed to the stretching device as a single-layer plastic film, which is in particular double-width. A plastic film cut on two sides can be separated into its individual layers, wherein the layers can each be fed to an individual stretching device. A winding device may comprise a winding station for winding an uncut, single-cut or double-cut double-layer plastic film. A single-layer, i.e. unfolded, plastic film cut on one side can also be wound up. However, two winding points can also be provided for winding one layer each of the previously double-layered plastic film.

Further features and details of the disclosure can be found in the following description, in which various exemplary embodiments are explained in detail with reference to the figures. The features mentioned in the description may be essential to the disclosure individually or in any combination of the features mentioned. Within the scope of the entire disclosure, features and details described in conjunction with the method according to the disclosure naturally also apply in conjunction with the stretching device according to the disclosure and vice versa in each case, so that reference is or can always be made mutually with respect to the disclosure on the individual aspects of the disclosure. In the individual figures:

DETAILED DESCRIPTION

Figure 1:
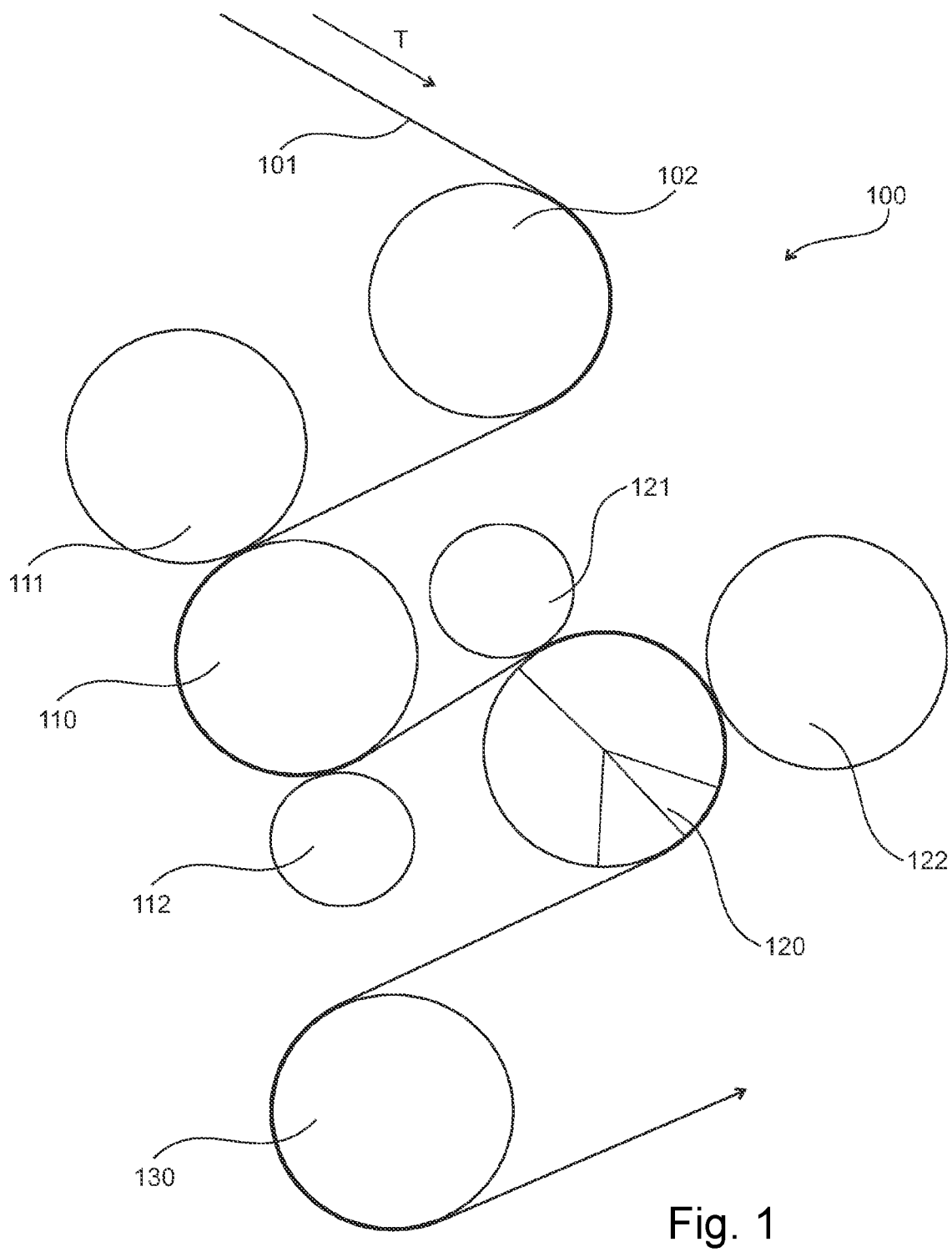
FIG. 1 shows a schematic view of a stretching device according to the disclosure

FIG. 1 shows a schematic representation of a stretching device according to the disclosure. The means for changing the amount of air between the plastic film and surface elements of the first roll and/or the second roll on which the film rests are not shown in FIG. 1 and will be explained in more detail in the following figures. The web-like plastic film 101 enters the stretching device 100 in the transport direction T. The plastic film first runs onto one or more preheating rolls, of which only one preheating roll 102 is shown. A preheating roll has the object of bringing the film to a predefined temperature. For this purpose, a preheating roll is usually temperature-controlled, wherein a temperature-controlled fluid is often introduced into the preheating roll.

After leaving the preheating roll(s) 102, the film web 101 passes onto a first roll 110, which can generally also be referred to as the first stretching roll 110. This stretching roll is connected to a drive (not shown); for example, its own electric motor, which drives the roll 110 in rotation at a first rotational speed.

The first roll 110 may be associated with a first feeding roll 111, which together with the first roll 110 provides an infeed gap for the film. In some embodiments, the infeed gap or the running path of the film 101 is arranged in such a way that the film 101 runs in the infeed gap tangentially to the rolls 110, 111. The roll gap already reduces the air between the stretching roll 110 and the film.

The first roll 110 is also associated with a second feeding roll 112, which forms an outfeed gap with the roll 110. The second feeding roll 112 may be adjustable in the circumferential direction of the first roll 110. The second feeding roll 112 is used to cause the film to exit the first roll 110 along a line parallel to the axial direction of the roll 110.

Seen in the transport direction T of the film 101, a second roll 120 is arranged downstream, which may be referred to as the second stretching roll 120. This stretching roll 120 is also connected to a further drive (not shown); for example, its own electric motor, which drives the roll 120 in rotation at a second rotational speed. The second rotational speed is greater than the first rotational speed, wherein the second stretching roll has a greater circumferential speed than the first stretching roll. This causes the film 101 to be stretched between the outfeed gap of the first roll 110 and the leading edge of the second roll 120 in proportion to the circumferential speeds in its transport direction. The distance between the outfeed gap and the leading edge is often referred to as the stretching gap.

It is possible that the first roll 110 and the second roll 120 can be moved relative to one another. This allows the stretching gap to be influenced. A change in the stretching gap can influence the properties of the film.

The second roll 120 may be associated with a third feeding roll 121, which together with the first roll 120 provides a second infeed gap for the film. In some embodiments, the infeed gap or the running path of the film 101 is arranged in such a way that the film 101 runs in the infeed gap tangentially to the rolls 120, 121. The roll gap already reduces the air between the stretching roll 120 and the film.

In the case that the gap is small, the third feeding roll 121 would collide with the roll 110, so that in this case the third feeding roll would have to be swung off.

The second roll 120 is also optionally associated with a fourth feeding roll 122, which forms an outfeed gap with the roll 120. The second feeding roll 122 may also be adjustable in the circumferential direction of the first roll 120. The second feeding roll 122 is used to cause the film to exit the first roll 120 along a line parallel to the axial direction of the roll 120.

In principle, it is also possible to dispense with one or more feed rolls in a stretching device according to the disclosure. Nevertheless, there can be talk of an infeed gap or an outfeed gap. This is then understood to be the line along which the film is applied to the stretching roll or along which the film is released from the stretching roll.

Further stretching rolls can be provided, in particular with one or two feeding rolls in each case, wherein two stretching rolls arranged directly one after the other are driven in each case in such a way that the stretching roll arranged downstream in each case has a higher circumferential speed than the preceding stretching roll.

Downstream of the stretching rolls 110, 120, a cooling roll 130 is arranged, with which the film 101 can be cooled again, so that the new molecular orientation within the film resulting from the stretching is solidified.

Figure 2:
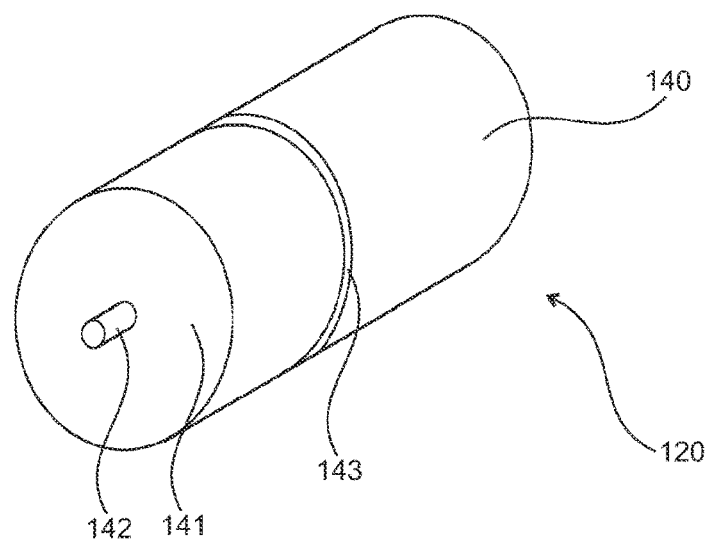
FIG. 2 shows a stretching roll of one embodiment of the disclosure

With reference to FIG. 2, an embodiment of the stretching device according to the disclosure is explained below. A perspective view of a stretching roll is shown for this purpose. In the example shown, it is the stretching roll 120. The latter comprises a roll shell 140 and end faces, of which the end face 141 is visible. The stretching roll in particular has a shaft, an axle or an axle stub. Of the aforementioned structural elements, only the part 142 projecting from the end face 141 is visible. The roll shell 140 now comprises recesses 143, which in the present example are shown as a circumferential groove. Further examples of recesses have already been provided earlier in the description of the disclosure. The characteristic of recesses is that they only protrude into the roll shell, but do not extend through the roll shell 140 into the interior of the roll defined by the roll shell and the end faces.

Figure 3:
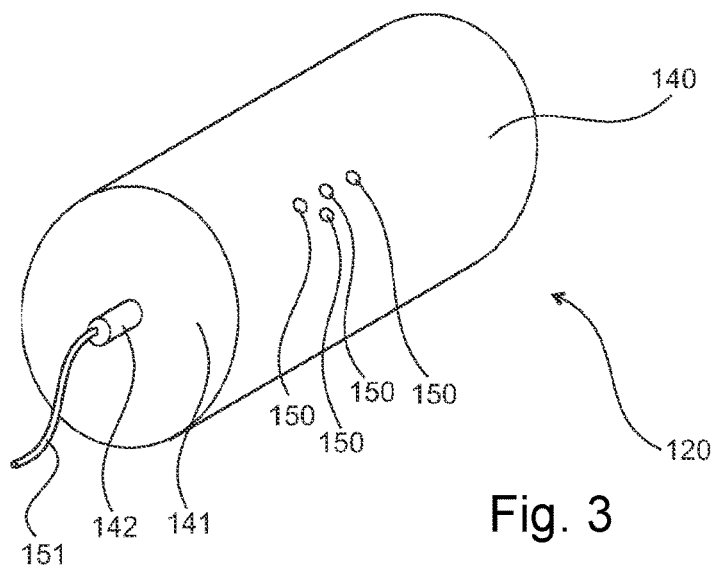
FIG. 3 shows a stretching roll of a further embodiment of the disclosure

FIG. 3 is similar to FIG. 2, but here the roll 120 comprises through-openings 150. The exact design of the through-openings has already been described above. The through-openings reach into the interior of the roll and thus form a fluid-communicating connection between the interior and the environment of the roll 120.

The interior of the roll 120 can optionally be applied with a negative pressure. For this purpose, the axle, shaft or axle stub can be provided with fluid lines. In the case of a shaft, fluid lines comprise a rotary feedthrough. The fluid line of the axle, shaft or axle stub is connected to another fluid line, such as a hose 151, which leads to a vacuum source.

Figure 4:
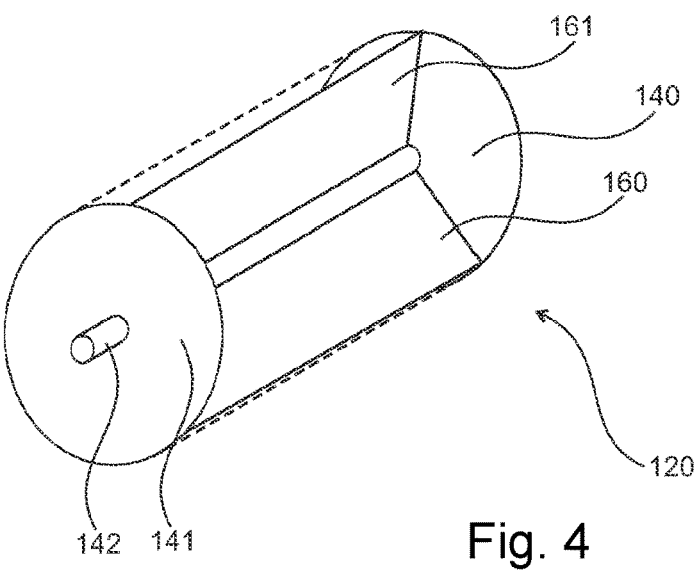
FIG. 4 shows a stretching roll of a further embodiment of the disclosure

FIG. 4 shows further possible features of a roll 120 that comprises through-openings. Here, the interior, which is now visible due to the omitted representation of the roll shell, can be divided into several individual spaces with separating walls; in the present example, two separating walls 160, 161. This makes it possible to apply different air pressures to the various individual spaces. In the present case with two individual spaces, one of them can, for example, be subjected to a negative pressure, while no positive or negative pressure can be applied in the second individual space, so that the ambient pressure prevails here.

Figure 5:
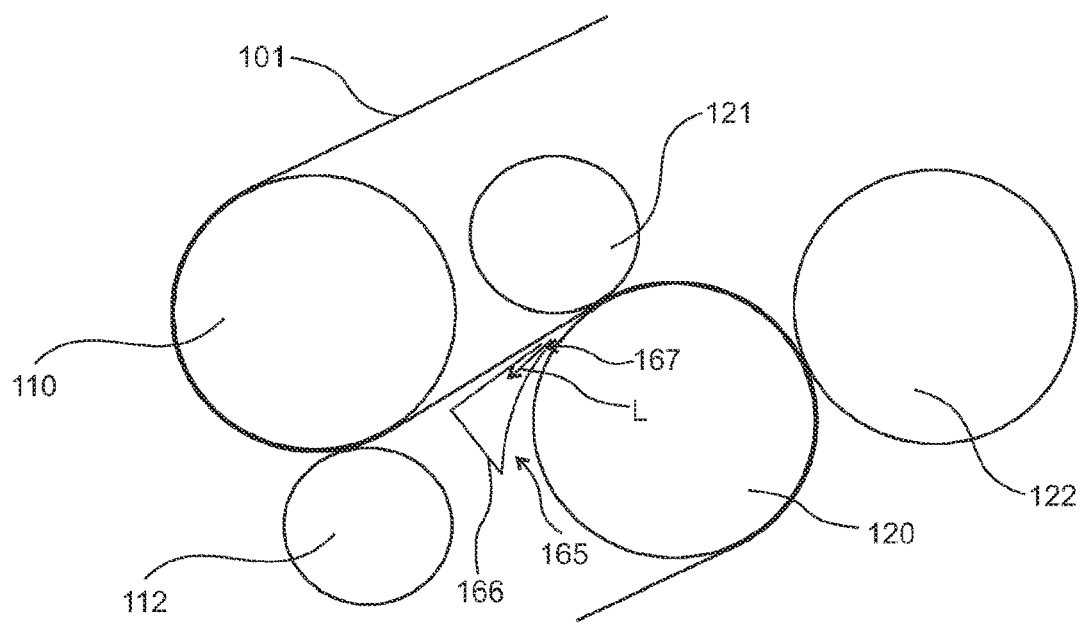
FIG. 5 shows an embodiment of the disclosure with a suction device

FIG. 5 shows an exemplary embodiment in which a suction device 165, which extends in the transverse direction with respect to the transport direction of the film 101, is arranged upstream of the stretching roll, here in particular the stretching roll 120. This suction device comprises a closed case 166 with one or more suction openings 167. In particular, the case can be subjected to a negative pressure so that air from the infeed gap enters the suction device through the suction openings in the direction of the arrow L and is discharged.

Figure 6:
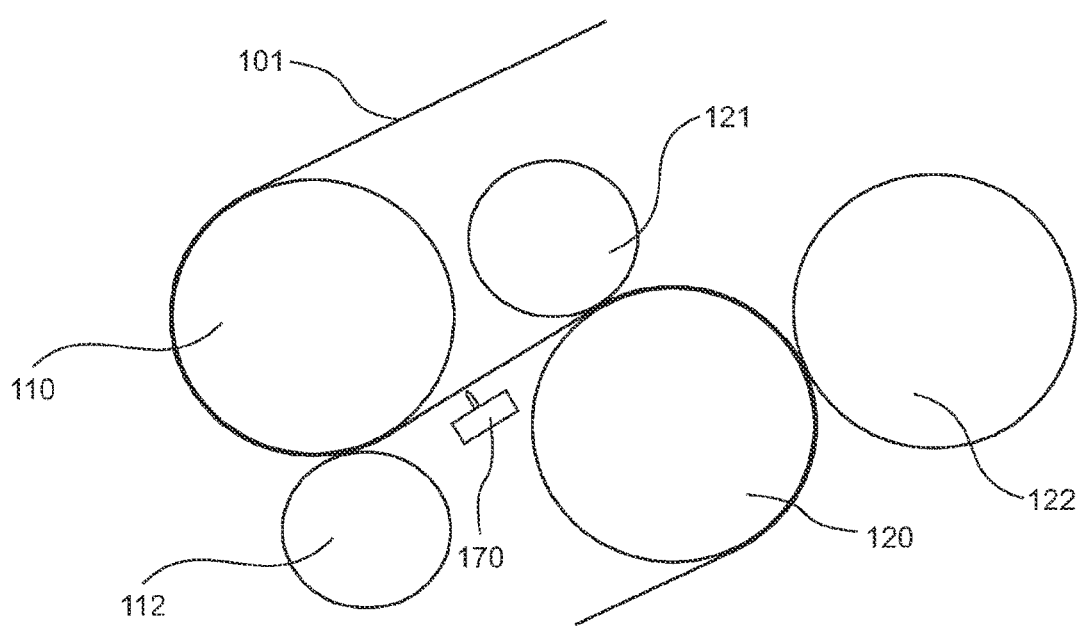
FIG. 6 shows an embodiment of the disclosure with an electrode

FIG. 6 shows a further exemplary embodiment of a stretching device according to the disclosure in which an electrode 170 is arranged upstream of the infeed gap of a stretching roll—in the example shown, the stretching roll 120. This electrode can be subjected to an electrical potential that differs in particular from the electrical potential of the film 101. This creates an electrical charge on the film, which results in the film being held on the stretching roll with an additional electrical force.

Figure 7:
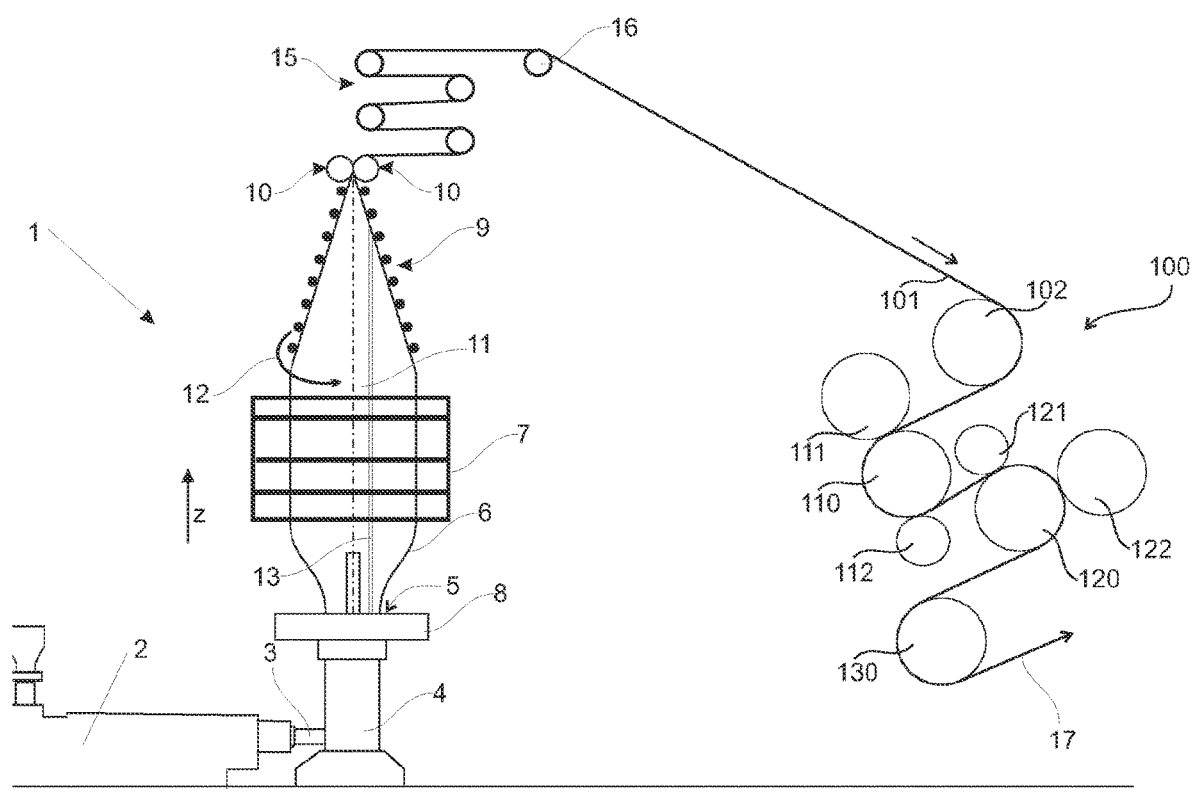
FIG. 7 shows a blown film system according to the disclosure having a stretching device

FIG. 7 shows a device 1 for producing a film tube, namely a blown film system, which initially comprises at least one extruder 2, with which, for example, plastic present in granular form can be plasticised. Via a line 3, the plastic melt thus produced is fed to an extrusion tool 4, which can also be referred to as a nozzle head, from which this melt is transferred into a film tube 6, so that this melt stream can be drawn out of an annular gap 5 (not visible in FIG. 7), in the drawing-off direction z. Now there is a film tube 6 that is not yet solidified. This is inflated from the inside by a slight overpressure so that it has a larger diameter inside the optional calibration device 7. The film tube is solidified in particular by a temperature control device 8, which is often also referred to as a cooling ring because of its annular design enclosing the film tube.

After passing through the calibrating device, the film tube 6 enters the active region of a flat laying device 9, in which the circular film tube is converted into an elliptical cross-section with an increasing eccentricity, until it finally forms a double-layered plastic film in the region of influence of the drawing-off rolls 10, which are joined together at their sides.

The flat laying device is rotatably arranged, wherein the axis of rotation is essentially aligned with the tube axis 11, which is indicated by a dashed line in FIG. 1. The rotatability of the flat laying device is indicated with the arrow 12.

FIG. 7 also shows a reversing device 15, which has the object of guiding the flattened film tube from the flat laying device to the stationary roll 16 without causing damage.

Downstream of the reversing device 15, a stretching device 100 according to the disclosure is now arranged, which has already been explained in conjunction with FIGS. 1 to 6 and the further description. The stretching device shown in FIG. 7 corresponds to the one shown in FIG. 1. It should also be noted that a cutting device can be positioned upstream of the stretching device 100, with which one or two edges of the fold can be cut open or cut off. In addition, a separating device can be provided with which the double-layer plastic film can be divided into one or more single-layer films.

The arrow 17 indicates that after passing through the stretching device 100, this film tube is fed to further processing, which is not specified in more detail here.

Figure 8:
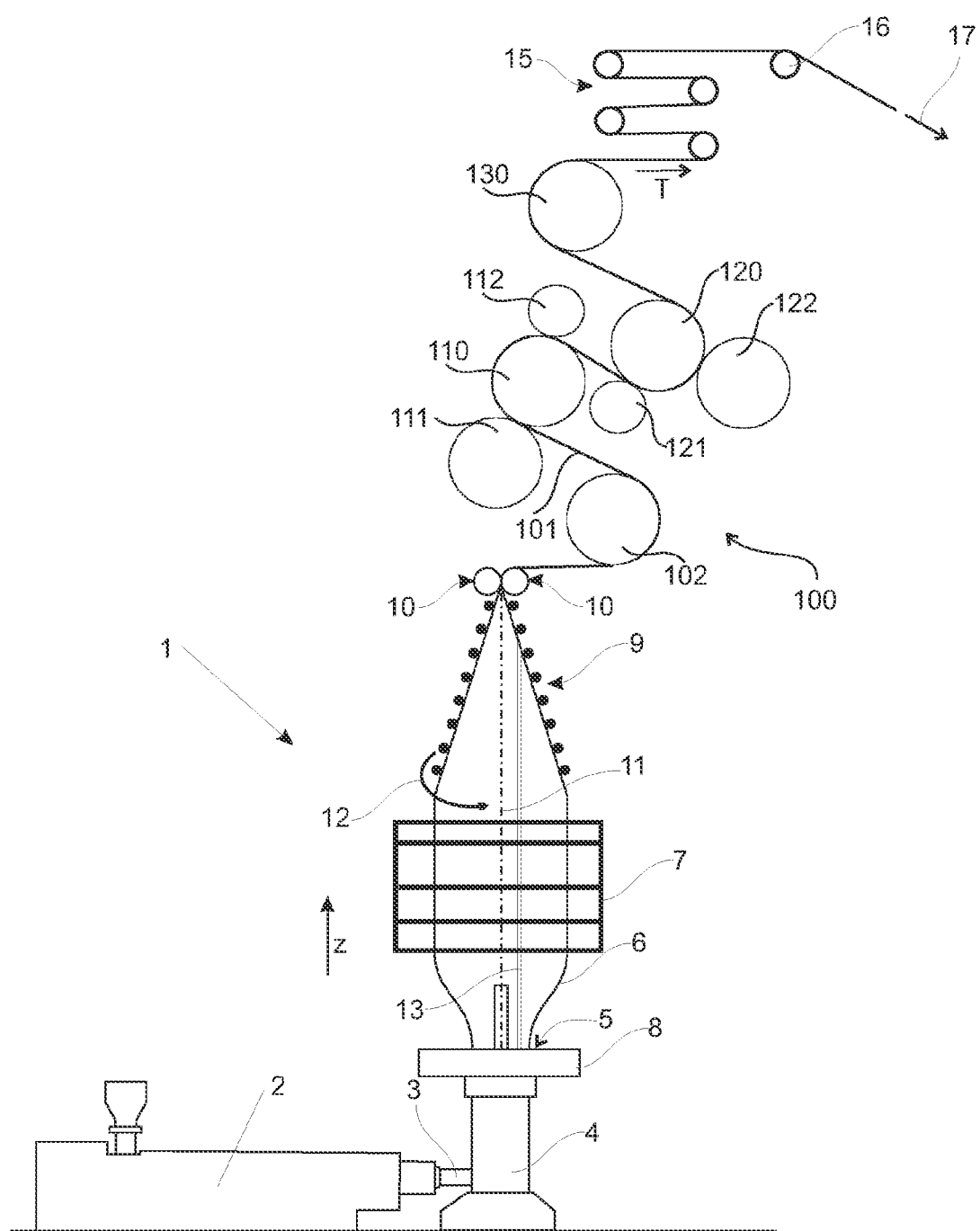
FIG. 8 shows a further blown film system according to the disclosure with a stretching device

FIG. 8 shows a further embodiment of a blown film system according to the disclosure in which the stretching device 100 is now arranged between the drawing-off rolls 10 and the reversing device 15. It should be noted that the rolls within the stretching device are now arranged in a sequence so that the plastic film can be transported from the bottom to the top.

Figure 9:
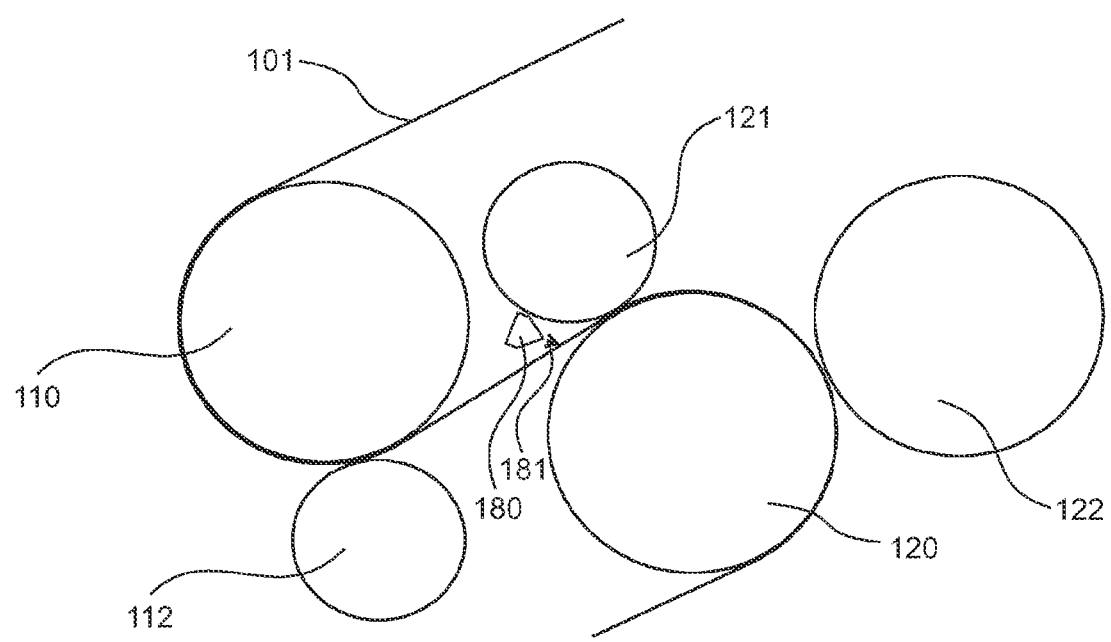
FIG. 9 shows an embodiment of the disclosure with a nozzle

FIG. 9 shows a further exemplary embodiment of a stretching device according to the disclosure in which at least one nozzle 180 is arranged upstream of the infeed gap of a stretching roll—in the example shown, the stretching roll 120. Through this nozzle, a pressurised fluid 181, in particular compressed air, can be applied to the film on the side facing away from the roll. This ensures that the film is pressed against the roll 120 with a force so that less air is drawn into the area between the film and the roll 120 by the movement of the film.

| List of Reference Characters | |
|---|---|
| 100 | Stretching device |
| 101 | Plastic film |
| 102 | Preheating roll |
| 110 | First roll |
| 111 | First feeding roll |
| 112 | Second feeding roll |
| 120 | First stretching roll |
| 121 | Third feeding roll |
| 122 | Second feeding roll |
| 130 | Cooling roll |
| 140 | Roll shell |
| 141 | End face |
| 142 | Part protruding from the end face 141 |
| 143 | Recesses |
| 150 | Through-opening |
| 151 | Tube |
| 160 | Separating wall |
| 161 | Separating wall |
| 165 | Suction device |
| 166 | Closed case |
| 170 | Electrode |
| 1 | Device for producing a film tube |
| 2 | Extruder |
| 3 | Line |
| 4 | Extrusion tool |
| 5 | Non-visible annular gap |
| 6 | Film tube not yet solidified |
| 7 | Optional calibration device |
| 8 | Temperature control device |
| 9 | Flat laying device |
| 10 | Drawing-off rolls |
| 11 | Tube axis |
| 12 | Arrow for clarifying the rotatability of the flat laying device |
| 13 | |
| 14 | |
| 15 | Reversing device |
| 16 | Stationary roll |
| 17 | |
| T | Transport direction |
| Z | Drawing-off direction |

The invention claimed is:

1. A stretching device for stretching a plastic film in the transport direction thereof, having a first roll, which can be driven by a first drive and can be rotated at a first rotational speed, and having a second roll, which can be driven by a second drive and can be rotated at a second rotational speed, wherein the second rotational speed is greater than the first rotational speed, and the second roll is arranged downstream of the first roll in the transport path of the plastic film,
- wherein at least one of the rolls is a roll through which air can flow inwards from the outside,
- wherein the at least one roll through which air can flow can be continuously cleaned,
- wherein through-openings are provided in the roll shell of the at least one roll through which air can flow, wherein the through-openings represent a fluid-communicating connection between the outer surface and at least one cavity inside the roll, and
- wherein at least one segmented chamber is arranged in the roll through which air can flow, via which solvent accommodated therein can be pressed through the through-openings for the cleaning thereof.

2. The stretching device according to claim 1, wherein
the through-openings in the roll shell are formed at least in part in each case by bores and/or porous material of which the roll shell consists at least in part.

3. The stretching device according to claim 1, wherein
only one part of the roll through which air can flow can have air flowing through it inwards from the outside, while another part can have air flowing through it outwards from the inside.

4. The stretching device according to claim 1, wherein
heating means are provided by means of which at least a part of the air flowing through the through-openings of the roll through which air can flow can be heated to such an increased temperature that synthetic material residues accumulated in the through-openings can be melted and blown out and/or suctioned-off.

5. The stretching device according to claim 4, wherein the synthetic material residues are paraffins.

6. A stretching device for stretching a plastic film in the transport direction thereof, having a first roll, which can be driven by a first drive and can be rotated at a first rotational speed, and having a second roll, which can be driven by a second drive and can be rotated at a second rotational speed, wherein the second rotational speed is greater than the first rotational speed, and the second roll is arranged downstream of the first roll in the transport path of the plastic film,
- wherein at least one of the rolls is a roll through which air can flow inwards from the outside,
- wherein the at least one roll through which air can flow can be continuously cleaned,
- wherein through-openings are provided in the roll shell of the at least one roll through which air can flow, wherein the through-openings represent a fluid-communicating connection between the outer surface and at least one cavity inside the roll,
- wherein only one part of the roll through which air can flow can have air flowing through it inwards from the outside, while another part can have air flowing through it outwards from the inside, and
- wherein on the one hand, means are provided for generating a vacuum, via which means air can flow at least partially inwards from the outside through the roll through which air can flow in the region in which the film is wrapped around it, and in that on the other hand, means are provided for generating an overpressure, via which air can be blown outwards from the inside through the through-holes outside the region in which the film is wrapped around, at least in partial regions, in order to clean the film.

7. The stretching device according to claim 6, wherein
at least one suction device for applying a negative pressure to the surface is arranged externally in the region of the surface of the roll through which air can flow that is not wrapped by the film.

8. The stretching device according to claim 6, wherein
at least one scraper for scraping off solid substances from the surface is arranged on the outside in the region of the surface of the roll through which air can flow that is not wrapped by the film.

9. A stretching device for stretching a plastic film in the transport direction thereof, having a first roll, which can be driven by a first drive and can be rotated at a first rotational speed, and having a second roll, which can be driven by a second drive and can be rotated at a second rotational speed, wherein the second rotational speed is greater than the first rotational speed, and the second roll is arranged downstream of the first roll in the transport path of the plastic film,
- wherein at least one of the rolls is a roll through which air can flow inwards from the outside,
- wherein the at least one roll through which air can flow can be continuously cleaned, and
- wherein the roll through which air can flow comprises at least one cavity in the form of a chamber that is divided in the axial direction and/or in the circumferential direction into at least two segments by means of at least one separating element, wherein at least one segment in each case can be acted upon by an air pressure that is reduced or increased in comparison with the ambient pressure.

10. A stretching device for stretching a plastic film in the transport direction thereof, having a first roll, which can be driven by a first drive and can be rotated at a first rotational speed, and having a second roll, which can be driven by a second drive and can be rotated at a second rotational speed, wherein the second rotational speed is greater than the first rotational speed, and the second roll is arranged downstream of the first roll in the transport path of the plastic film,
- wherein at least one of the rolls is a roll through which air can flow inwards from the outside,
- wherein the at least one roll through which air can flow can be continuously cleaned,
- wherein through-openings are provided in the roll shell of the at least one roll through which air can flow, wherein the through-openings represent a fluid-communicating connection between the outer surface and at least one cavity inside the roll,
- wherein only one part of the roll through which air can flow can have air flowing through it inwards from the outside, while another part can have air flowing through it outwards from the inside,
- wherein on the one hand, means are provided for generating a vacuum, via which means air can flow at least partially inwards from the outside through the roll through which air can flow in the region in which the film is wrapped around it, and in that on the other hand, means are provided for generating an overpressure, via which air can be blown outwards from the inside through the through-holes outside the region in which the film is wrapped around, at least in partial regions, in order to clean the film, and wherein at least one burner for burning away synthetic material residues or means for generating an ion beam or means for generating a corona for removing the synthetic material residues are arranged on the outside in the region of the surface of the roll through which air can flow that is not wrapped by the film.

* * * * *